United States Patent
Balko

(10) Patent No.: US 8,863,131 B2
(45) Date of Patent: *Oct. 14, 2014

(54) TRANSACTION LOAD REDUCTION FOR PROCESS COMPLETION

(71) Applicant: Soeren Balko, Indooroopilly (AU)

(72) Inventor: Soeren Balko, Indooroopilly (AU)

(73) Assignee: SAP AG, Walldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/149,256

(22) Filed: Jan. 7, 2014

(65) Prior Publication Data

US 2014/0123143 A1 May 1, 2014

Related U.S. Application Data

(63) Continuation of application No. 13/289,606, filed on Nov. 4, 2011, now Pat. No. 8,661,441.

(51) Int. Cl.
*G06F 9/46* (2006.01)
*G06F 9/48* (2006.01)

(52) U.S. Cl.
CPC ............... *G06F 9/466* (2013.01); *G06F 9/485* (2013.01)
USPC .......................................... 718/100; 718/107

(58) Field of Classification Search
None
See application file for complete search history.

(56) References Cited

U.S. PATENT DOCUMENTS

| 8,046,383 | B2 | 10/2011 | Weber et al. | |
| 2005/0209993 | A1* | 9/2005 | Koehler | 707/1 |
| 2006/0259289 | A1* | 11/2006 | Shia | 703/12 |
| 2008/0301419 | A1 | 12/2008 | Barros et al. | |
| 2009/0113394 | A1* | 4/2009 | Weber et al. | 717/126 |
| 2009/0164985 | A1* | 6/2009 | Balko et al. | 717/162 |
| 2009/0327199 | A1* | 12/2009 | Weber et al. | 706/48 |
| 2010/0050132 | A1* | 2/2010 | Shia | 715/854 |
| 2011/0161733 | A1 | 6/2011 | Thomson et al. | |
| 2011/0239183 | A1 | 9/2011 | Paradkar et al. | |

OTHER PUBLICATIONS

"Query Optimizer," Wikipedia®, [online], last modified Sep. 4, 2011, <http://en.wikipedia.org/wiki/Query_optimizer>, retrieved Nov. 4, 2011, 3 pages.

"Rete algorithm," Wikipedia®, [online], last modified Aug. 29, 2011, <http://en.wikipedia.org/wiki/Rete_algorithm>, retrieved Nov. 4, 2011, 8 pages.

"First-order logic," Wikipedia®, [online], last modified Nov. 3, 2011, <http://en.wikipedia.org/wiki/First-order_logic>, retrieved Nov. 4, 2011, 20 pages.

(Continued)

*Primary Examiner* — Emerson Puente
*Assistant Examiner* — Dong Kim
(74) *Attorney, Agent, or Firm* — Fish & Richardson P.C.

(57) ABSTRACT

The present disclosure involves systems, software, and computer implemented methods for reducing transaction load for process instance completion. One process includes identifying an end event triggered by an initial token of a process instance, determining a type of the end event, performing a search for additional tokens associated with the process instance that are distinct from the initial token, and performing a termination action based on the type of end event and a number of additional tokens identified in the search. The end event type may be non-terminating or terminating, and the end event type can determine the termination action to be performed. If the end event is non-terminating, then the termination action includes joining each finalization action for each process instance variable to a completion transaction if no additional tokens are found and executing the completion transaction to terminate the process instance.

15 Claims, 7 Drawing Sheets

(56) References Cited

OTHER PUBLICATIONS

"Object Management Group/Business Process Management Initiative," BPMN Information Home, [online], updated Sep. 28, 2011; <<http://www.bpmn.org/>> retrieved Nov. 4, 2011; 2 pages.

U.S. Appl. No. 12/848,679, filed Aug. 2, 2010, Balko et al.
U.S. Appl. No. 13/094,366, filed Apr. 26, 2011, Balko.
U.S. Appl. No. 13/102,837, filed May 6, 2011, Klinker et al.
U.S. Appl. No. 13/206,960, filed Aug. 10, 2011, Balko.

* cited by examiner

TRANSACTION LOAD REDUCTION FOR PROCESS COMPLETION

CLAIM OF PRIORITY

This application claims priority under 35 USC §119(e) to U.S. patent application Ser. No. 13/289,606, filed on Nov. 4, 2011, the entire contents of which are hereby incorporated by reference.

TECHNICAL FIELD

The present disclosure relates to software, computer systems, and computer implemented methods for reducing transaction load for process instance completion in a business process management suite runtime service.

BACKGROUND

Process instances have complex statuses that are maintained in status variables for control flow tokens to maintain the progress of the associated process, data objects to maintain process instance-relevant business data, and other process instance variables. In some instances, there may be a large number and high data volume of status variables per process instance. Top-level process instances and sub-processes have their own set of status variables. In some business process management utilities, user tasks may maintain their own status variables. When processes terminate, associated status variables may need to be "cleaned" or deleted to avoid memory leaks and to notify business process management components such as administration and monitoring tools that "track" those variables when the process has ended. For instance, certain business process management applications have dedicated components for process management for tracking process instances and tokens and context management for tracking data objects. The components may need to perform finalization actions such as cleaning up associated internal states, writing log entries, or notifying other applications, including the final status of certain data objects. Process termination can be a frequent operation that significantly contributes to the total process turnaround time, in some instances because complex processes frequently spawn sub-processes to reuse existing functionality and to structure processes in a comprehensible manner. Those sub-processes also need to be terminated, as they can cause significant performance penalties for the overall end-to-end process turn-around time. Further, for termination of each process instance, a significant number of finalization transactions may need to be performed for each process instance variable associated with the process instance.

SUMMARY

The present disclosure involves systems, software, and computer implemented methods for reducing transaction load for process instance completion. One process includes identifying an end event triggered by an initial token of a process instance, determining a type of the end event, performing a search for additional tokens associated with the process instance that are distinct from the initial token, and performing a termination action based on the type of end event and a number of additional tokens identified in the search. The end event type may be non-terminating or terminating, and the end event type can determine the termination action to be performed. If the end event is non-terminating, then the termination action includes joining each finalization action for each process instance variable to a completion transaction if no additional tokens are found and executing the completion transaction to terminate the process instance.

While generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
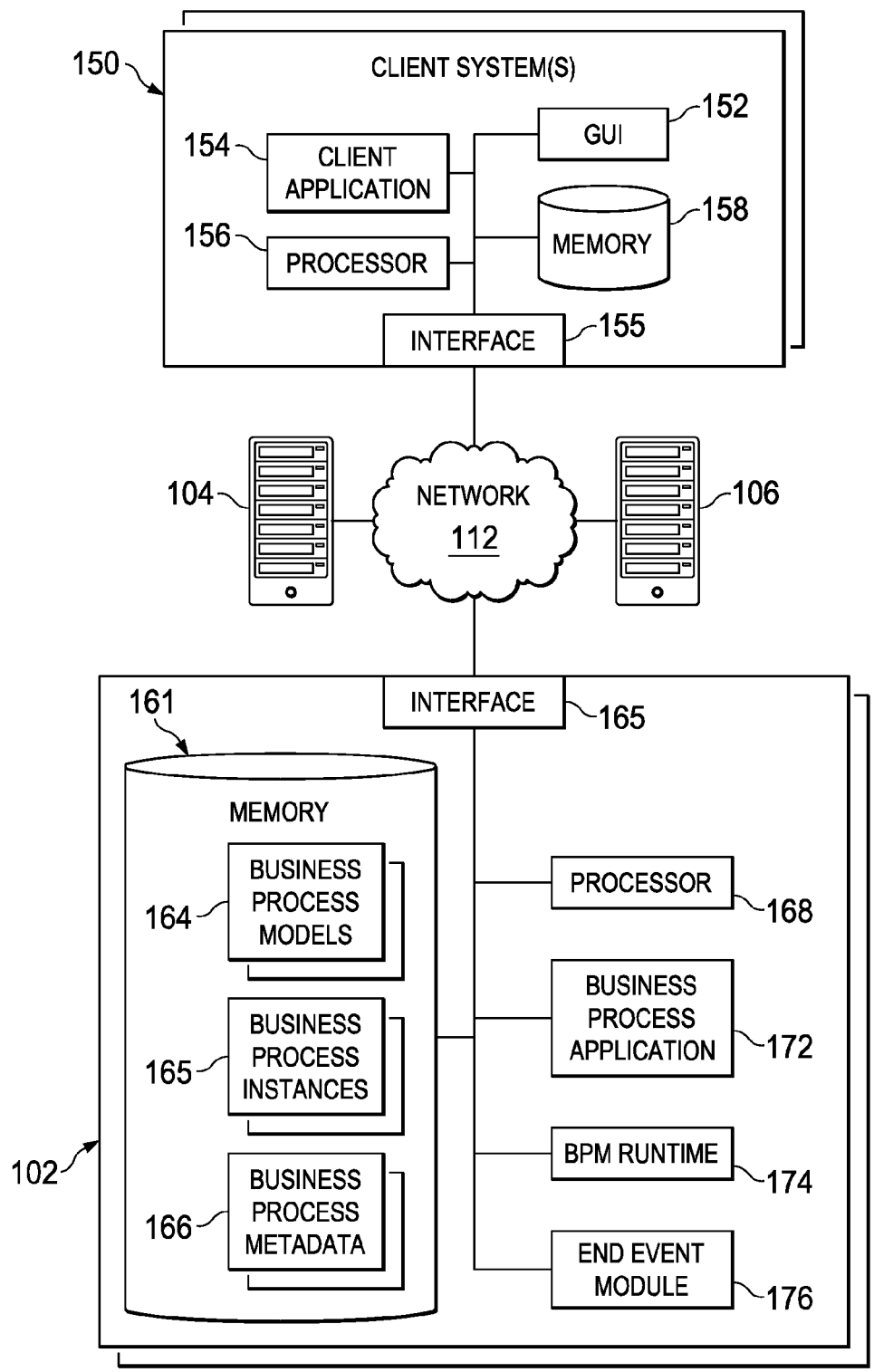
FIG. 1 illustrates an example environment for executing an end event associated with a process instance.

This disclosure generally describes computer systems, software, and computer implemented methods for reducing transaction load for process instance completion. Termination of a particular process instance may require performing finalization actions on process instance variables associated with the process instance. In some instances, the finalization actions may include resolving internal states or generating log entries for each status variable of the process instance, for example. In some instances, finalization actions may include notifying external components and applications. The finalization of each variable may typically be a separate transaction, but when an end event for the process instance is triggered, first-order logic fragments and/or conditions may be generated to join the transactions for performing finalization actions for the process instance with an overall completion transaction for terminating the process instance. Additionally, conditions can be generated at compile time, and in some instances, once for all further process instances. The evaluation of the conditions can occur individually in each process instance upon reaching an end event. Accordingly, the finalization tasks associated with termination of a process instance, including finalization of all status variables of the process instance, may be performed in the same transaction as the termination of the process instance.

A process instance or a token of the process instance may be terminated when an "end event" is triggered. Generally, end events demarcate a control flow branch of some process model indicated an end of that branch. Different meta models can be used for the design time and the runtime. For instance, in one example, the design time can be prepared in BPMN, while the runtime can be prepared using trigger networks, or operator graphs that represent event-condition-action rules where the event is a status variable change, the condition is an arbitrary first-order predicate on the status variables, and the action is a custom script to perform follow-up status changes and engage in communications with external applications through adapters. In some implementations, the compiler rules for various types of end events in a business process management system may be altered. First-order terms or predicates and other logic evaluation fragments may be generated to join separate transactions for progressively cleaning up process instance variables (e.g., data objects, tokens, views, and other helper variables) into a single, primary transaction whose resources are acquired conservatively, or atomically before a transaction starts, thus avoiding rollbacks due to lock acquisition failures or other resource contentions that may hamper system performance. In some cases, end events may differ by (1) the particular "event trigger" (e.g., message, signal, error, etc.) associated with the end event (e.g., an end event can send a message to an external recipient, provide a signal to another process instance, initiate an administration and/or monitoring application, etc.) and (2) the completion semantics, such as terminating or "non-terminating" end events. The reduction in transaction load, or the number of transactions pending execution at the same point in time, for completion of process instances of the present disclosure may transparently apply to numerous event triggers (i.e., the types of end events that are used in top-level processes, referenced and embedded sub-processes, user tasks, multiple-instance activities, etc.), thus, covering a large share of total process turnaround time. Sub-process completion is a frequent action that is performed in complex business processes. With respect to the completion semantics, the present disclosure provides for (i) cleaning up numerous remaining tokens in the to-be-terminated process instance for terminating end events and (ii) figuring out whether a token that has triggered a regular end event is the last remaining token of the affected process instance and/or sub-process instance such that when executing the end event, the entire process instance and/or sub-process instance (including all of its status variables) can be concurrently and, in some instances, near instantaneously, cleaned up in one transaction. As used in the present disclosure, a token associated with a process instance is an active branch of the process instance, and denotes a thread of control which executes process steps on some process branch concurrently to other tokens of that instance.

Performing the completion of each finalization action in the same transaction for terminating a process instance may reduce the total process instance turnaround time for several reasons, including (1) savings on the (timely) overhead of allocating separate transactions for cleaning up status variables and (2) reducing the likelihood for resource contentions, such as lock conflicts, which may negatively affect process performance. Process termination may be a frequent operation that significantly contributes to the total process turnaround time. For example, process instances may host a significant number of status variables (conceptually, the number of status variables is unbounded and may surpass two-digit numbers) that need to be "cleaned up" after the process has come to completion. The status variables may include all data objects (one status variable per modeled data object) associated with the process instance, a fixed number of views (for user roles, lanes, custom text variables, etc.), and multi-purpose "helper" variables that buffer some other information. Top-level processes, referenced (linked-in, reusable) sub-processes, embedded sub-processes and process fragments that track some externalized logics status, such as user tasks, which use the same termination mechanisms and occur frequently in an end-to-end process. Further, the business process management notation compiler may artificially designate additional embedded sub-processes to facilitate Multiple Instance Activities. In particular, it may nest embedded sub-process instances to represent the loop and each loop cycle of a multiple instance activity. Each of those sub-processes may need to be terminated when a loop cycle and the loop ends, respectively.

Further, in some implementations of business process management systems, process termination involves merely deleting a token (i.e., ends a thread of control) and performing some custom action (specific to the respective end event) when an end event is triggered. Cleaning up the status variables of the process instance may occur either in nested (synchronous) transactions (if transactional coupling to the token removal is required) or asynchronously, in a separate transaction or in multiple separate transactions (e.g., one per status variable). Either of the two approaches may have implications on the performance of the process instance and the load on the business process management system runtime. For example, synchronously nested transactions may prolong the transactional boundary of the primary transaction (which has initiated the token removal). In effect, a thread is blocked for a long period of time and CPU cycles are wasted in evaluating the pre-conditions of other transactions, including nested transactions, after each nested transaction is complete. Further, exclusive resources (e.g., locks) are held for a long time such that concurrent transactions competing for those resources may fail and need to be rolled back and retried, which, in turn, prolongs their duration or allows them to fail entirely. The nested transaction chain may additionally need to acquire additional locks lazily (i.e., each nested transaction in the chain only acquires their locks once it is started) such that additional resources are progressively acquired and, thus, cannot adhere to a conservative two-phase locking profile. In effect, the lengthy nested transaction chain may fail to acquire a lock and may either be delayed (if it waits for the lock and ultimately succeeds to acquire the same) or abort, roll-back and be retried. Thus, all work that was done before, if the lock cannot be acquired even after waiting for some finite period of time, may be lost.

Asynchronously running transactions may adhere to a conservative locking profile (C2PL) and not suffer from late rollbacks. Each transaction, however, may cause significant overhead on the execution system (e.g., increased load on the in-memory transaction management and the underlying database). Further, each transaction may occupy a separate thread such that the thread is not available for other work (e.g., to make progress in other process instances). Finally, multiple concurrent transactions for cleaning up status variables may be prone to resource contentions when performing conflicting accesses to shared resources among one another.

The inclusion of the entire process cleanup work in a single, primary transaction can reduce the need to off-load the cleanup work to synchronous or asynchronous follow-up transactions. While the primary transaction may be slightly prolonged to perform the cleanup tasks, the primary transaction merely performs the cleanup actions "in place" (i.e., sequentially without any additional work to be performed in between the cleanup instructions) while not requiring full rule evaluation round-trips for the synchronously nested transactions. Additionally, the single primary transaction may adhere to a conservative locking protocol, reducing the risk for late roll-backs because all resource locks are acquired before the transaction has started.

Turning to the illustrated example, FIG. 1 illustrates an example environment 100 for providing reducing transaction load for process instance completion. In some implementations, the process instances are associated with business processes represented using business process management (BPM) systems. Business process management (BPM) can include representing processes of an organization as components, steps, or data flows within a model so that current business processes can be analyzed, automated, optimized, re-engineered, or extended. The illustrated environment 100 includes or is communicably coupled with one or more clients 150 and servers 102, 104, and 106, at least some of which communicate across network 112.

In general, environment 100 depicts an example configuration of a system capable of reducing transaction load for process instance completion by combining separate transactions for finalizing process instance variables into a single transaction for terminating a process instance. In some implementations, the end event module 176 for determining different views for different users can be implemented as a hosted application on a server, such as server 102, accessible to a user at client 150 through a network 112. The end event module 176 may not be, in many instances, a dedicated module, but can instead provide for improved characteristics of end event implementations by altering the compiler to generate the trigger networks, such as those shown in FIGS. 2, 3, and 5. In effect, the end event module's functionality can be downward compatible with the existing BPM stack and does not need any additional components at runtime, thereby decreasing the corresponding development costs. In those instances, the end event module 176 can be understood to be inherent functionality within the compiler and its associated components. Further, the end event module 176 and other services provided by server 102 can be distributed across multiple servers, such as servers 104 and 106, in a distributed cluster-based environment, for example. In a distributed cluster-based environment, one or more additional servers (e.g., servers 104 and 106) can be included in environment 100, each server having components similar to those depicted in FIG. 1 for server 102 and providing services associated with distributed applications hosted by the servers in the distributed cluster-based environment. In certain instances, client 150 and servers 102, 104, and 106 can be logically grouped within a cloud computing network. Accordingly, the system may be provided as an on-demand solution through the cloud computing network as well as a traditional server-client system or a local application at client 150. Alternatively, the end event module 176 may be provided through a traditional server-client implementation or locally at client 150 without the need for accessing a hosted application through network 112.

In general, server 102 is any server that stores one or more business process applications 172, where at least a portion of the hosted applications are executed via requests and responses sent to users or clients within and communicably coupled to the illustrated environment 100 of FIG. 1. For example, server 102 may be a Java Platform, Enterprise Edition (JEE)-compliant application server that includes Java technologies such as Enterprise JavaBeans (EJB), JEE Connector Architecture (JCA), Java Messaging Service (JMS), Java Naming and Directory Interface (JNDI), and Java Database Connectivity (JDBC). In some instances, the server 102 may store a plurality of various business process applications 172, while in other instances, the server 102 may be a dedicated server meant to store and execute only a single business process application 172. In some instances, the server 102 may comprise a web server or be communicably coupled with a web server, where the business process applications 172 represent one or more web-based applications accessed and executed via network 112 by clients 150 of the system to perform the programmed tasks or operations of the business process application 172.

At a high level, the server 102 comprises an electronic computing device operable to receive, transmit, process, store, or manage data and information associated with the environment 100. The server 102 illustrated in FIG. 1 can be responsible for receiving application requests from one or more client applications or business applications associated with clients 150 of environment 100, responding to the received requests by processing said requests in the associated business process application 172, and sending the appropriate response from the business process application 172 back to the requesting client application. The server 102 may also receive requests and respond to requests from other components on network 112. Alternatively, the business process application 172 at server 102 can be capable of processing and responding to requests from a user locally accessing server 102. Accordingly, in addition to requests from the external clients 150 illustrated in FIG. 1, requests associated with the hosted applications 172 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server 102, environment 100 can be implemented using one or more servers such as servers 104 and 106, as well as computers other than servers, including a server pool. Indeed, server 102 and client 150 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 and client 150 may be adapted to execute any operating system, including Linux, UNIX, Windows, Mac OS, or any other suitable operating system.

In the present implementation, and as shown in FIG. 1, the server 102 includes a processor 168, an interface 165, a memory 161, and one or more business process applications 172. The interface 165 is used by the server 102 for communicating with other systems in a client-server or other distributed environment (including within environment 100) connected to the network 112 (e.g., clients 150, as well as other systems communicably coupled to the network 112). Generally, the interface 165 comprises logic encoded in software and/or hardware in a suitable combination and operable to communicate with the network 112. More specifically, the interface 165 may comprise software supporting one or more communication protocols associated with communications such that the network 112 or interface's hardware is operable to communicate physical signals within and outside of the illustrated environment 100.

In some implementations, server 102 may include a user interface, such as a graphical user interface (GUI). The GUI comprises a graphical user interface operable to, for example, allow the user of the server 102 to interface with at least a portion of the platform for any suitable purpose, such as creating, preparing, requesting, or analyzing data, as well as viewing and accessing source documents associated with business transactions. Generally, the GUI provides the particular user with an efficient and user-friendly presentation of business data provided by or communicated within the system. The GUI may comprise a plurality of customizable frames or views having interactive fields, pull-down lists, and buttons operated by the user. For example, GUI may provide interactive elements that allow a user to select from a list of suggested entries for input into a data field displayed in GUI. More generally, GUI may also provide general interactive elements that allow a user to access and utilize various services and functions of application 172. The GUI is often configurable, supports a combination of tables and graphs (bar, line, pie, status dials, etc.), and is able to build real-time portals, where tabs are delineated by key characteristics (e.g. site or micro-site). Therefore, the GUI contemplates any suitable graphical user interface, such as a combination of a generic web browser and command line interface (CLI) that processes information in the platform and efficiently presents the results to the user visually.

Generally, example server 102 may be communicably coupled with a network 112 that facilitates wireless or wireline communications between the components of the environment 100 (i.e., between the server 102 and clients 150), as well as with any other local or remote computer, such as additional clients, servers, or other devices communicably coupled to network 112 but not illustrated in FIG. 1. In the illustrated environment, the network 112 is depicted as a single network in FIG. 1, but may be a continuous or discontinuous network without departing from the scope of this disclosure, so long as at least a portion of the network 112 may facilitate communications between senders and recipients.

Network 112 may be all or a portion of an enterprise or secured network, while in another instance at least a portion of the network 112 may represent a connection to the Internet. In some instances, a portion of the network 112 may be a virtual private network (VPN), such as, for example, the connection between client 150 and server 102. Further, all or a portion of network 112 can comprise either a wireline or wireless link. Example wireless links may include 802.11a/b/g/n, 802.20, WiMax, and/or any other appropriate wireless link. In other words, network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. Network 112 may also include one or more local area networks (LANs), radio access networks (RANs), metropolitan area networks (MANs), wide area networks (WANs), all or a portion of the Internet, and/or any other communication system or systems at one or more locations. Network 112, however, is not a required component of the present disclosure, and the elements hosted by server 102, such as the block identification module 176, may be implemented locally at a client 150 or locally at server 102.

Client(s) 150 may have access to resources such as server 102 within network 112. In certain implementations, the servers within the network 112, including server 102 in some instances, may comprise a cloud computing platform for providing cloud-based services. The terms "cloud," "cloud computing," and "cloud-based" may be used interchangeably as appropriate without departing from the scope of this disclosure. Cloud-based services can be hosted services that are provided by servers such as 102, 104, and 106 and delivered across a network to a client platform to enhance, supplement, or replace applications executed locally on a client computer. Clients 150 can use cloud-based services to quickly receive software upgrades, applications, and other resources that would otherwise require a lengthy period of time before the resources can be delivered to clients 150. Additionally, other devices may also have access to cloud-based services, such as on-demand services provided by servers accessible through network 112. A cloud platform deployment implementation, however, is not a required element of the present disclosure, and other distributed infrastructures such as cluster-based systems can also be used.

As illustrated in FIG. 1, server 102 includes a processor 168. Although illustrated as a single processor 168 in FIG. 1, two or more processors may be used according to particular needs, desires, or particular embodiments of environment 100. Each processor 168 may be a central processing unit (CPU), a blade, an application specific integrated circuit (ASIC), a field-programmable gate array (FPGA), or another suitable component. Generally, processor 168 executes instructions and manipulates data to perform the operations of server 102 and, specifically, the one or more plurality of business process applications 172. Specifically, the server's processor 168 executes the functionality required to receive and respond to requests from client system 150 and respective client applications 154 or other servers 104 and 106 in environment 100, as well as the functionality required to perform the other operations of the business process application 172.

Regardless of the particular implementation, "software" may include computer-readable instructions, firmware, wired or programmed hardware, or any combination thereof on a tangible, non-transitory, medium operable when executed to perform at least the processes and operations described herein. Indeed, each software component may be fully or partially written or described in any appropriate computer language including C, C++, Java, Visual Basic, assembler, Perl, any suitable version of 4GL, as well as others. Some software may be associated with BPM notations including BPMN, BPEL, UML state charts, event-driven process chains (EPC), Petri Nets, and the like. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 168 executes one or more business process applications 172 on server 102.

At a high level, each of the one or more business process applications 172 is any application, program, module, process, or other software that may execute, change, delete, generate, or otherwise manage information according to the present disclosure, particularly in response to and in connection with one or more requests received from the illustrated client system 150 and its associated client applications 154 or from other servers or components through a network 112. In certain cases, only one business process application 172 may be located at a particular server 102. In others, a plurality of related and/or unrelated business process applications 172 may be stored at a single node 102, or located across a plurality of other nodes 102, as well. In certain cases, environment 100 may implement a composite business process application 172. For example, portions of the composite application may be implemented as Enterprise Java Beans (EJBs) or design-time components may have the ability to generate run-time implementations into different platforms, such as JEE (Java Platform, Enterprise Edition), ABAP (Advanced Business Application Programming) objects, or Microsoft's .NET, among others.

Additionally, one or more of the business process applications 172 may represent web-based applications accessed and executed by remote system 150 or client applications 154 via the network 112 (e.g., through the Internet). Further, while illustrated as internal to server 102, one or more processes associated with a particular business process application 172 may be stored, referenced, or executed remotely. For example, a portion of a particular business process application 172 may be a web service associated with the application that is remotely called, while another portion of the business process application 172 may be an interface object or agent bundled for processing at a client system 150. Moreover, any or all of the business process applications 172 may be a child or sub-module of another software module or enterprise application (not illustrated) without departing from the scope of this disclosure. Still further, portions of the business process application 172 may be executed by a user working directly at server 102, as well as remotely at client system 150.

As illustrated, server 102 can also include a business process management (BPM) runtime 174 that provides services, libraries, and tools for executing business process applications. The BPM runtime 174 may be used to execute business processes that are compiled into event-condition-action rules, such as those included within a trigger network. The enhanced end event functionality may be provided as altered or modified rules within the BPM runtime 174, taking advantage of the inherent first-order logic capabilities of a condition evaluation processor, such as the included within the BPM runtime. The BPM runtime 174 can also handle any state changes to business processes, including state changes associated with execution of process steps based on received events. Server 102 can also execute an end event module 176 or functionality of the end event module 176 that is included within one or more system components that reduces transaction load for process instance completion by combining separate transactions for finalizing process instance variables into a single transaction for terminating a process instance. In some implementations, the end event module 176 can be executed by a different processor or server external to server 102, such as by a server communicably coupled to server 102 through network 112. For example, the end event module 176 may be provided as an on-demand service through a cloud computing network, as a web service accessible via network 112, as a service provided on a dedicated server, or as an application in a cluster-based distributed network.

The end event module 176, or the enhanced end event behaviors within the BPM runtime 174 or other components, can provide services for reducing transaction load when terminating process instances. In some implementations, triggering the enhanced end event behavior with one-step termination can happen through first-order logic-based rules which are generated by a process compiler at runtime and evaluated by the existing BPM runtime 174. The advantage over introducing a dedicated component for providing the improved end event behavior is to re-use existing and/or unchanged components within the BPM runtime 174 (e.g., a rule evaluation and transaction execution system), thus restricting changes introduced in the end event operations to the compiler and avoiding runtime performance penalties to analyze the specifics of an end event scenario (i.e., a terminating or non-terminating end event, an upper bound of token count for terminating end events, a number of additional process status variables other than tokens, which happen at compile-time, or before the process is deployed to a particular BPM runtime system. The end event module 176, or the enhanced end event behaviors within the BPM runtime 174 or other components, may identify an end event triggered by a token of a process instance and initiate a first-order logic evaluation to join each finalization transaction for each process instance variable associated with the process instance with an overall completion transaction for the end event. The completion transaction can then be executed to terminate the process instance and to perform the finalization actions associated with termination of the process instance in a single transaction. In the present disclosure, a business process model may be any directed graph of process steps such as activities, tasks, events, gateways, or sequential steps performed in association with a particular business context, business partner, or customer. Business processes may be performed in software as a computer program and/or in connection with a computer microprocessor, server, workstation, instance of a computer program, thread of execution within a computer program, or other data processing element. Each process token corresponds to a thread of execution. Further, as used in the present disclosure, the end event module 176 may be separate from business process application 172, while in other instances, the end event module 176 may be embedded within or part of business process application 172 or one or more other hosted applications. Alternatively, the end event module 176 may not be a runtime entity, but instead a logical module encapsulating extra and/or altered rules generated by the BPM's compiler.

In general, server 102 also includes memory 161 for storing data and program instructions. Memory 161 may include any memory or database module and may take the form of volatile or non-volatile memory including, without limitation, magnetic media, optical media, random access memory (RAM), read-only memory (ROM), removable media, or any other suitable local or remote memory component. Memory 161 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of server 102 and its one or more business process applications 172.

Memory 161 may also store data objects such as business process models 164 used by the end event module 176. For example, a particular process model 164 may include process model definitions and parameters associated with a particular business process. The process models 164 may be retrieved from memory 161 when the end event module 176 is consolidating end event transactions for terminating process instances of the process models 164. In some implementations, the process models 164 are business process models based on business process model and notation (BPMN) representations. In particular, BPMN provides rich expressiveness with (1) different end event types which differ in the termination semantics and side effects, (2) the option of having multiple end events in a process model, and (3) having multiple tokens acting in a single process instance at runtime. These capabilities contribute to the complexity of end event semantics, which are normally prone to have a negative performance impact, and, thus, give rise to the present disclosure. BPMN process models may be graph-oriented and can include blocks, which provide the ability to comprehend, drill down, or collapse features within a process model, such as to navigate between different process granularities. In some instances, custom views with different granularities for different end user roles can be provided in BPMN-based process models. Memory 161 may also store information associated with process instances 165. The process instances 165 may be retrieved by a runtime environment during modification of a business process. A process instance can consist of variables that hold the status of a particular process. The variables capture the progress of control and data flows using elements such as instruction pointers (i.e., tokens) and variables holding instances of business documents that were manipulated during execution of the process (i.e., data objects). Memory 161 can also store other business process metadata 166 associated with the process instances 165.

The illustrated environment of FIG. 1 may also include one or more clients 150. Each client 150 may be any computing device operable to connect to or communicate with at least the server 102 and/or via the network 112 using a wireline or wireless connection. In some implementations, as illustrated in FIG. 1, client 150 can also include a processor 156, an interface 155, a graphical user interface (GUI) 152, a client application 154, and a memory 158. In general, client 150 comprises an electronic computer device operable to receive, transmit, process, and store any appropriate data associated with the environment 100 of FIG. 1. It will be understood that there may be any number of clients 150 associated with, or external to, environment 100. For example, while illustrated environment 100 includes one client 150, alternative implementations of environment 100 may include multiple clients communicably coupled to the server 102, or any other number of clients suitable to the purposes of the environment 100. Additionally, there may also be one or more additional clients 150 external to the illustrated portion of environment 100 that are capable of interacting with the environment 100 via the network 112. Further, the term "client" and "user" may be used interchangeably as appropriate without departing from the scope of this disclosure. Moreover, while each client 150 is described in terms of being used by a single user, this disclosure contemplates that many users may use one computer, or that one user may use multiple computers.

The GUI 152 associated with client 150 comprises a graphical user interface operable to, for example, allow the user of client 150 to interface with at least a portion of the platform for any suitable purpose, such as creating, preparing, requesting, or analyzing data, as well as viewing and accessing source documents associated with business transactions. Generally, the GUI 152 provides the particular user with an efficient and user-friendly presentation of business data provided by or communicated within the system. The GUI 152 may comprise a plurality of customizable frames or views having interactive fields, pull-down lists, and buttons operated by the user. For example, GUI 152 may provide interactive elements that allow a user to enter, modify, select, or model elements of business process instances in GUI 152. A view of a process model based on the user's role within a business organization may be presented and accessible to the user through GUI 152, such as through a web browser, for example. The business process steps, interdependencies and modification options may be graphically rendered and presented in GUI 152 to allow a user to contribute to or view a business process modeling task. More generally, GUI 152 may also provide general interactive elements that allow a user to access and utilize various services and functions of application 154. The GUI 152 is often configurable, supports a combination of tables and graphs (bar, line, pie, status dials, etc.), and is able to build real-time portals, where tabs are delineated by key characteristics (e.g. site or micro-site). Therefore, the GUI 152 contemplates any suitable graphical user interface, such as a combination of a generic web browser, intelligent engine, and command line interface (CLI) that processes information in the platform and efficiently presents the results to the user visually.

As used in this disclosure, client 150 is intended to encompass a personal computer, touch screen terminal, workstation, network computer, kiosk, wireless data port, smart phone, personal data assistant (PDA), one or more processors within these or other devices, or any other suitable processing device. For example, each client 150 may comprise a computer that includes an input device, such as a keypad, touch screen, mouse, or other device that can accept user information, and an output device that conveys information associated with the operation of the server 102 (and business process application 172) or the client 150 itself, including digital data, visual information, client application 154, or GUI 152. Both the input and output device may include fixed or removable storage media such as a magnetic storage media, CD-ROM, or other suitable media to both receive input from and provide output to users of client 150 through the display, namely, GUI 152.

While FIG. 1 is described as containing or being associated with a plurality of elements, not all elements illustrated within environment 100 of FIG. 1 may be utilized in each alternative implementation of the present disclosure. For example, although FIG. 1 depicts a distributed cluster-based environment implementing a hosted application at servers 102, 104, and 106 that can be accessed by client computer 150, in some implementations, server 102 executes a local application that features an application UI accessible to a user directly utilizing GUI 152. Further, although FIG. 1 depicts a server 102 external to network 112, servers may be included within the network 112 as part of a cloud network solution, for example. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Certain BPM representations may provide for various artifacts that will or may end a process instance. For example, in BPMN implementations, some artifacts, such as Terminating End Events and Error End Events, may unambiguously end the process instance. Other types of end events, such as Message End Events or Escalation End Events, merely complete a single thread of control (i.e., a token), leaving other process threads unaffected. In some instances, whether an end event is "terminating" and the side effects it yields (i.e., the trigger type) are orthogonal aspects. In other words, a Message End Event that sends some message to an external party may also be a terminating end event. In these types of end events, the process instance will be terminated once the last token has vanished. The latter requirement poses a dilemma for code that is generated for non-terminating end events inasmuch as rules that are compiled for these entities do not take other process branches into account. Consequently, separate rules may be defined (1) for end events which, among other things, "delete" a single token, (2) for conditionally terminating a process instance if there are not any tokens left, and (3) for deleting any status variable once the associated process has terminated. The chain of rules may lead to a high number of transactions that are run in sequence once a process/sub-process/task instance is about to end. For example, first the end event is triggered which deletes a single token (i.e., ends a thread of control on a single control flow branch) and may yield some side effect (e.g., sends a message). Then, if there are no other tokens left in this process instance, the process instance, which is another status variable, is terminated or deleted. Finally, for each other status variable (e.g., for any data object of that process) another transaction runs to delete that status variable.

In the case of a non-terminating end event, at compile time a single rule is created which simultaneously deletes all status variables in one transaction, as opposed to creating many independent rules, each deleting a single status variable. An optimization phase may be executed for joining finalization transactions associated with status variables of a process instance with a primary termination transaction for the process instance. In some implementations, the optimization phase uses the first-order logics (FOL) foundations of event-condition-action (ECA) rules that are run in the BPM application kernel. In alternative BPM stacks, different execution models may be used. The compiler rules for non-terminating end events may be altered to support alternative cases when the end event deletes the last token of a particular process instance or when there are other tokens left in the process instance. A token of a non-suspended process is checked to trigger an end event and make sure no other token exists which also belongs to the same process instance. If the token is not the last token in the process instance, that is, if there is still another token in the process instance, the corresponding rule may terminate the token but does not terminate the process instance or clean up the process state variables in the process instance.

Figure 2:
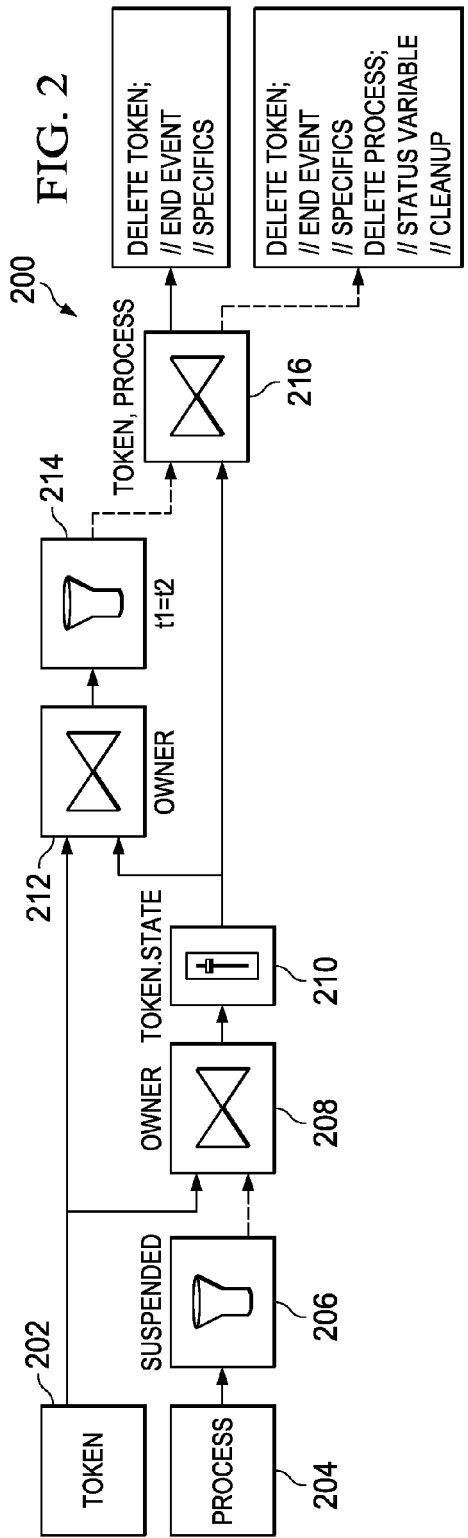
FIG. 2 illustrates a diagram of operators used for processing a non-terminating end event using an appropriate system, such as the system described in FIG. 1.

FIG. 2 illustrates an example diagram of operators 200 used for processing a non-terminating end event. The non-terminating end event may be an end event for terminating a particular token in a process instance, but if there are remaining tokens in the process instance, the process instance will not be terminated. If there are no remaining distinct tokens in the process instance, the entire process instance may be terminated within the same transaction. In some implementations, certain operators in a Trigger Network logic evaluation process associated with BPMN representations may be used to process a non-terminating end event. As depicted in FIG. 2, a process instance 204 is checked at operator 206 to determine whether the process instance 204 is suspended. If the process instance 204 is suspended, rule evaluation stops at the suspension operator 206. In doing so, quick filtering of irrelevant events (i.e., such as affecting suspended process instances) is possible to avoid further evaluation, thus saving CPU cycles and other runtime resources, such as operating system threads, main memory, transaction handlers, and others. If the process instance 204 is not suspended at operator 206, a token 202 may be joined to the present process 204 through a join operator 208 to form at least one tuple consisting of the present process and the initial token 202. The operator 206 does not alter any state (such as to suspend a process), but instead checks whether or not a particular process is suspended. The operator 206 is for (sub-)condition evaluation. The join operator 208 can potentially form multiple tokens, pairing up a process instance with any of its tokens. That is, if there are many tokens, $t_1, t_2, \ldots, t_n$, for a process p, the join operator 208 will form the tuples $(t_1, p), (t_2, p), \ldots, (t_n, p)$. If multiple process instances are joined to multiple token instances, the process instances and tokens may be paired as tuples.

The process 204 and token 202 pair may then be forwarded to a switch operator 210 that checks whether the token 202 is associated with the appropriate state. In some instances, the appropriate state may be the state that denotes the end event. Token states are unique labels identifying process model elements, thus marking where inside the process a particular token is currently executing. In some instances, the switch operator 210 may operate as a pipeline filter. If the state of the token 202 is associated with an end event, the switch operator 210 may duplicate the process/token tuple for input into two branches. As seen in FIG. 2, the join operator 212 and filter operator 214 in the upper branch may determine whether there are other distinct tokens associated with the process instance 204. Token 202 and process 204 do not relate to particular instances of a type (such as a single particular token or process instance), but to all tokens and all process instances. If an identified token instance is distinct from the original token 202 as determined by filter operator 214, the output from the filter operator 214 provides for prevention of the process instance 204 from being terminated by the end event because there are remaining distinct tokens within the process instance 204. If, however, the identified token instance is the same as the original token 202, the input into the final join operator 216 results in deletion of both the token 202 and the process instance 204 since the other identified token is merely another instance of the same original token 202. Accordingly, the finalization actions may be performed for terminating the process instance 204 and the token 202, and finalizing the remaining status variables.

Figure 3:
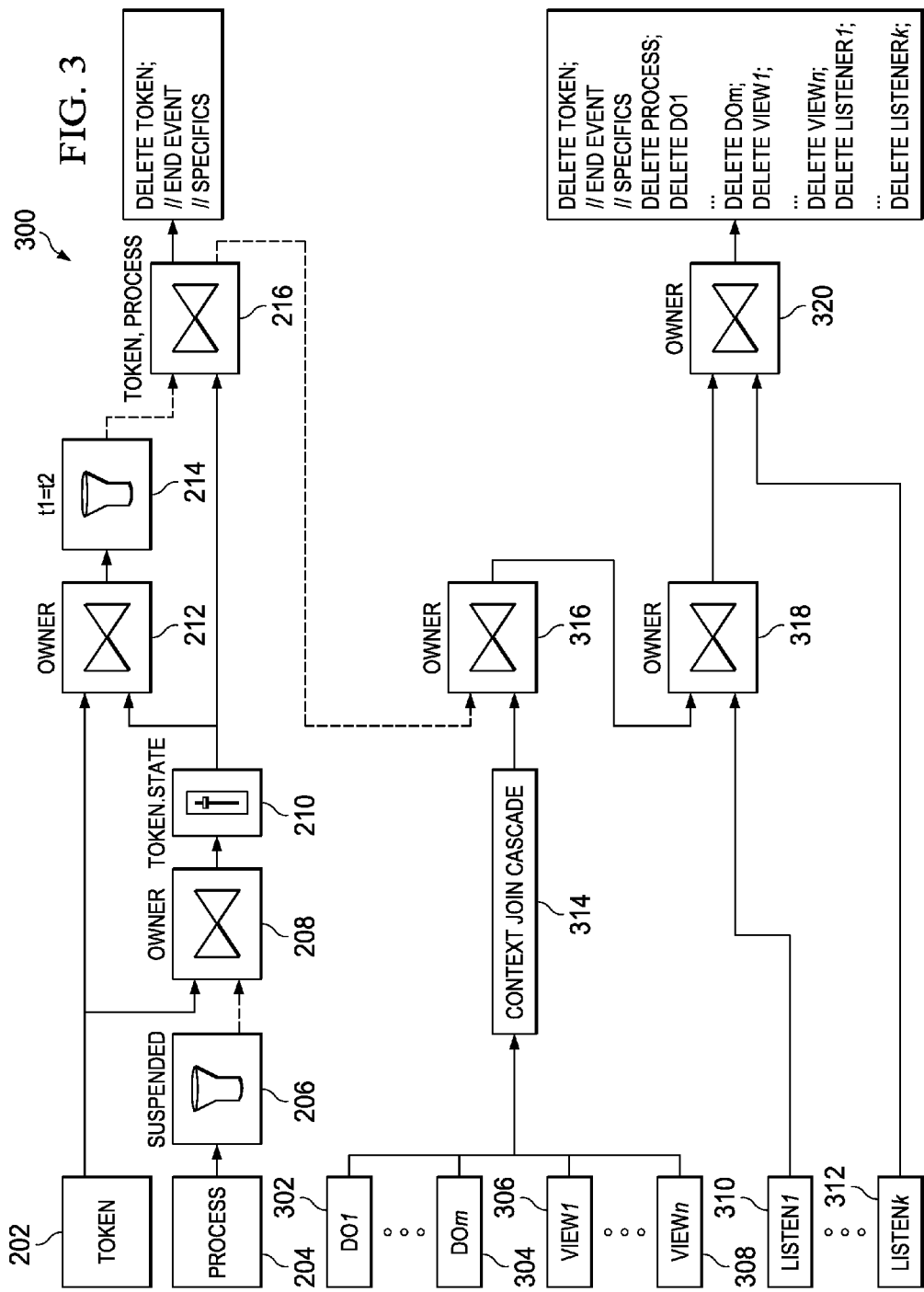
FIG. 3 illustrates a diagram of operators used for processing a non-terminating end event using an appropriate system, such as the system described in FIG. 1.

In some implementations, the remaining status variables are added to the transaction performing the status variable finalization. FIG. 3 illustrates an example diagram of operators 300 used to join status variable finalization transactions with an overall process instance termination transaction. Accordingly, the status variables may be finalized in the same transaction as used for terminating the process instance. As illustrated in FIG. 3, the status variables 302-308 associated with the same process instance may be combined using a cascade of join operators 314 and 316. In certain instances, a status variable may have an "owner" attribute pointing to the process instance. Accordingly, an existing context join cascade 314 for joining data objects and views (e.g., user roles, lanes, text variables and other dynamically computed data) may be used. In certain implementations, other status variables, such as "Listener" instances 310 and 312, for example, may need to be joined separately using join operators 318 and 320.

Although the compiler rules may be altered for various types of end events within a BPM representation, the dedicated rules (i.e., a set of separate rules for terminating a process once the last token was (externally) deleted and/or terminated) for process termination once the last token of a process instance has vanished and for cleaning up status variables once the process has terminated may still apply to facilitate external administrative actions intended to forcefully cancel a process or set a single token to completion. The dedicated rules may continue to contribute to a process' static footprint (i.e., the memory resources required to host a process model in the BPM runtime), but the turnaround time benefits from altering the compiler rules for certain end events may reduce the number of follow-up rules which fire upon the last token's removal. Further, the transaction load may be reduced, and the likelihood of resource contentions may also be greatly reduced. By occupying fewer (concurrent) transactions for process termination, fairness (to other process instances) may also be slightly improved. Restated, concurrent process instances may, in turn, allocate those runtime resources (i.e., CPU time slices, OS threads, main memory, transaction handles, database connections, etc.) to appropriate activities and operations.

In certain cases, some end events forcefully terminate a process even if other tokens still exist in the process instance. For example, in BPMN, the Terminating (Message) End Event and the (Critical) Error End Event behave in this manner. Accordingly, the status variables of the process instance may also be cleaned up in the primary transaction running the actual end event. As implemented with respect to non-terminating end events, a join cascade may be used to combine and "wire up" status variables to the respective transaction in the corresponding Trigger Network. A single join cascade may be reused for all end events (regular and terminating) to reduce the static footprint (e.g., the number of Trigger Network operators) of the process instance, such as, for instance, the trigger network illustrated in FIG. 5.

For Terminating End Events, a forceful process termination may occur, in contrast to non-terminating end events such as described above in relation to FIG. 2, while other tokens still exist for a particular process instance. For example, one token out of potentially a number of tokens may trigger a Terminating End Event and trigger completion of the process instance accordingly. The token that triggered the end event may also be cleaned up to end the corresponding thread of control. The number of remaining tokens, however, within the same process may be unknown at this time. If the "dangling" tokens (e.g., remaining tokens or tokens pending termination) are offloaded to separate transactions for termination, the process instance termination may experience resource contention and performance problems.

Figure 4:
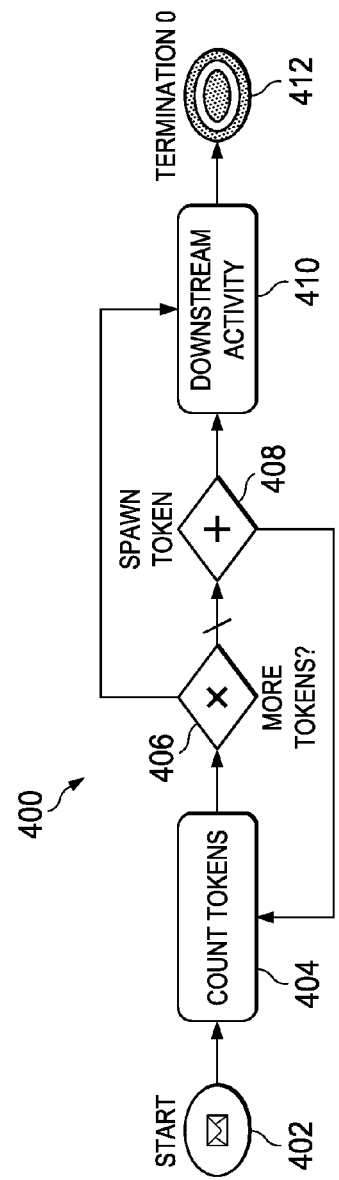
FIG. 4 illustrates an example business process model and notation (BPMN)-based process model that may result in one or more tokens within a process instance.

Although the potential number of dangling tokens may appear small with manageable finalization tasks, the BPMN representation may allow for building non-block-structured processes that spawn a dynamic number of tokens. For instance, FIG. 4 illustrates an example process model 400 that may result in additional tokens within a process instance. A process instance may start at start event 402 and the number of tokens in the process instance is counted at activity 404. If there are more tokens at 406, additional tokens may be produced or created at 408. The process model 400 in FIG. 4 depicts a pattern where a parallel split ("Spawn Token") gateway 408 is put into a loop that creates additional tokens and sends the tokens to some downstream activity 410. Although the additional tokens are passed to a downstream activity 410, the process instance may continue with the loop for creating additional tokens. The creation of additional tokens is only stopped when an exclusive gateway ("More Tokens?") 406 breaks out of the loop (e.g., based on some dynamic number of tokens that were supposed to be created) and proceeds to process termination 412. Apart from those fully dynamic scenarios, a process model may also simply comprise multiple parallel branches that are simultaneously "active" (i.e., carry a distinct token which trigger the respective process steps on each branch). Each of the scenarios is possible in BPMN representations. Further, the "multiple branches" use-case may provide an estimate of a strict upper bound on the number of distinct tokens that may exist simultaneously. In some instances, a "non-tight" upper limit (i.e., at runtime the actual number of tokens when the process terminates may be below that number) of the total token count can be computed for processes containing no cycles based on the splitting gateways' outbound edges counts.

Figure 5:
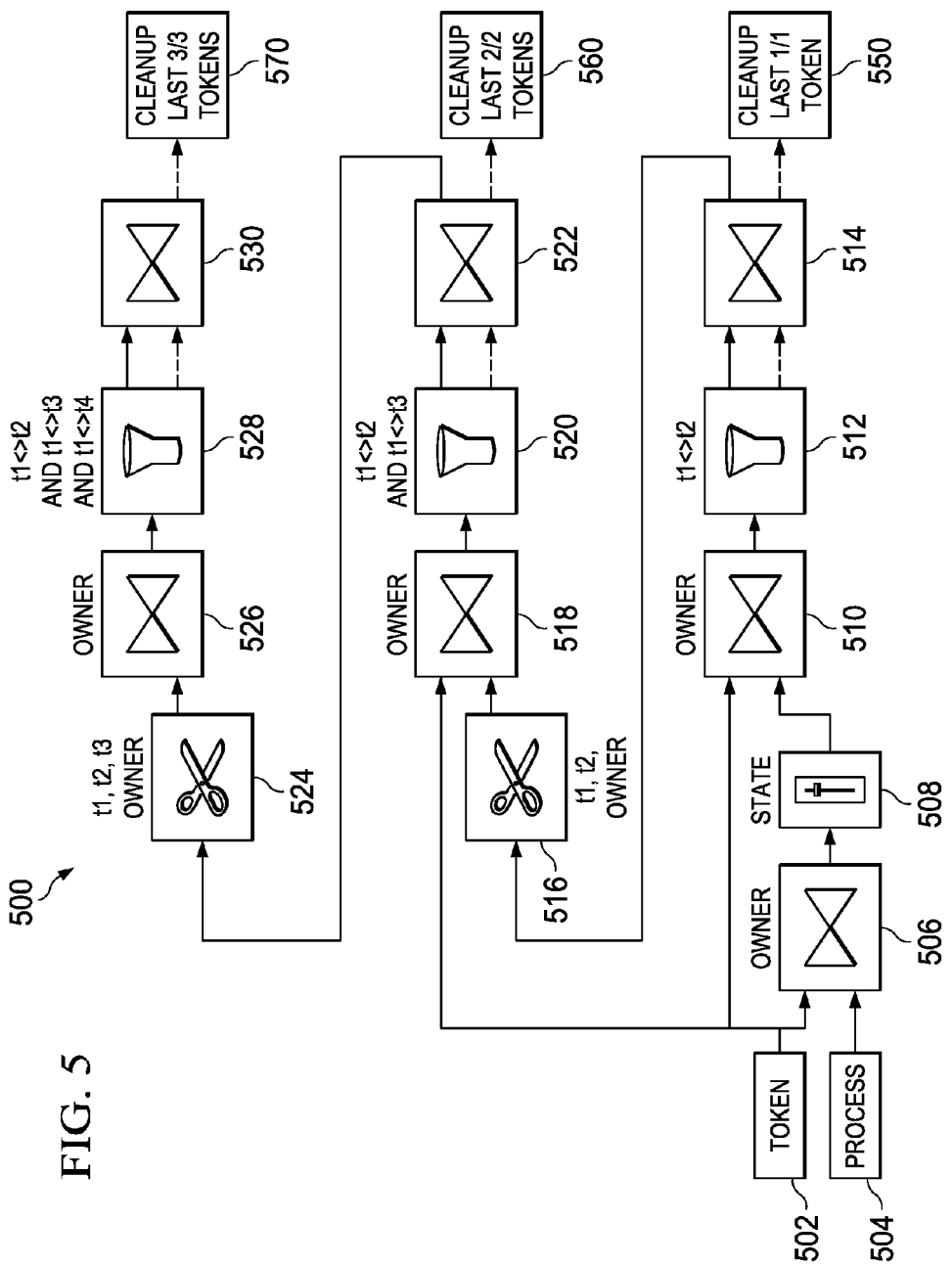
FIG. 5 illustrates a diagram of operators used for processing a terminating end event using an appropriate system, such as the system described in FIG. 1.

FIG. 5 illustrates an example diagram of operators 500 used to process a terminating end event. A terminating end event may require termination of a particular token in a process instance that triggered the end event as well as any remaining tokens associated with the process instance. The terminating end event may cause termination of the process instance regardless of whether there may be pending tokens associated with the process instance. The number of distinct, remaining tokens, however, may vary depending on the process instance. In some implementations, a Trigger Network mechanism can be used to delete a varying number of distinct tokens in a single transaction, as depicted in FIG. 5. For instance, in FIG. 4, two process instances may each create a different number of tokens based on the condition when the "More Tokens" exclusive split gateway 406 breaks out of the loop. Differently sized combinations of distinct tokens can be assembled from a single process instance 504. The initial process fragment joins a single token 502 to the corresponding process instance 504 through a join operator 506. In certain instances, the initial token 502 may be the token that triggered the end event. The process fragment checks for the token 502 being in a state of the Terminating End Event through a switch operator 508. The successive cascade of join operators 510, 518, 526, filter operators 512, 520, 528, Join operators 514, 522, 530, and projection operators 516, 524 allows the process fragment to progressively add other tokens to the process instance 504 that are different. For example, the initial join operator 510 after the switch operator 508 forms tuples representing all permutations of the process instance and its tokens. For a process instance that has two tokens $t_1$ and $t_2$, with $t_1$ being the token that has triggered the end event, join 510 forms the tuples ($p, t_1, t_2$) and ($p, t_1, t_1$). At this point, the additional token may be identical to or different from the initial token that triggered the end event. If the additional token is identical to the initial token, there is no need to join the additional token to the process/token tuple. However, as the join operator cannot determine this, the tuple may be created and a downstream filter operator may be used to remove the repetitive tuple.

A filter operator 512 may be used to determine whether the initial token is different than the incoming token. The filter operator 512 may simply compare the two tokens, which may be referred to as t1 and t2 in the present example. Any tuples (process, t1, t2) where t1 and t2 are different are passed to the filters upper outbound edge, or "true" exit, while the other tuples where t1 and t2 are instances of the same token are passed to the lower outbound edge, or "false" exit. In certain implementations, the upstream join operator finds all combinations of two tokens. If it fails to find any token combination where t1 and t2 are different, the downstream join operator will solely receive tuples on its second entry, from the filter's "false" exit, such that its "right inhibitor" (dashed outbound edge) fires and enables the transition which removes the single token that exists in that process.

In another example using the Trigger Network mechanism depicted in FIG. 5, an example process instance p may have two tokens $t_a$ and $t_b$ where $t_a$ triggers the process' Terminating End Event. Ideally, all tokens (e.g., $t_a$ and $t_b$) would be removed in a single transaction with the process instance. The switch operator 508 pushes a tuple ($p, t_a$) to the cascade's first join operator 510 (second entry) while both $t_a$ and $t_b$ (plus tokens from other process instances) are pushed to the join operator's first entry. The join operator 510 forms the tuples ($t_a, t_a, p$) and ($t_b, t_a, p$) and pushes them to the filter operator 512 which sends ($t_a, t_a, p$) to its "false" exit and ($t_b, t_a, p$) to its "true" exit. The join operator 514 receives input on both input channels and forms a combination out of them ($t_b, t_a, p, t_a, t_a, p$). The join operator 514 then pushes the combination to the projection operator 516.

The projection operator 516 "cuts off" (i.e., projects out, or eliminates duplicates from the tuple) the second half of the tuple, leaving only ($t_b, t_a, p$) for further processing. The successive join operator 518 then joins $t_a$ and $t_b$ to that tuple, pushing $(t_a, t_b, t_a, p)$ and $(t_b, t_b, t_a, p)$ to the filter operator 520. The filter operator 520 checks for the first element of the tuple to be different from the second and the third. In the present example, neither tuple fulfills the requirement because the second element of both tuples ($t_b$) is identical for both tuples. Accordingly, both $(t_a, t_b, t_a, p)$ and $(t_b, t_b, t_a, p)$ are sent to the second entry of the join operator 522, which enables its "right inhibitor" exit, pushing them ahead to the "Cleanup 2/2 tokens" target node 560. Accordingly, two transactions, parameterized with the corresponding tuples, have been successfully instantiated and scheduled for asynchronous execution. As the first transaction to be scheduled will exclude the other one by conservatively acquiring exclusive locks on $t_a$, $t_b$, and p for the duration of the transaction and implicitly disabling the pre-condition of the other transaction by deleting those variables, only one transaction will ultimately be executed to delete $t_b$, $t_a$, and p.

The compiler can construct the Trigger Network to provide for different scenarios where any number of distinct tokens may still exist when one of them triggers a Terminating End Event. While FIG. 5 illustrates a network that can delete up to three (3) tokens in a single transaction, the network could be extended further to replicate the pattern as shown in each row of the network to delete additional tokens. Coming back to the proposed algorithm to estimate an upper bound of simultaneously co-existing tokens, the compiler may choose to craft the Trigger Network in such a way that for any number between 1 and the upper bound there is a path that cleans up all tokens in a single transaction.

Figure 6:
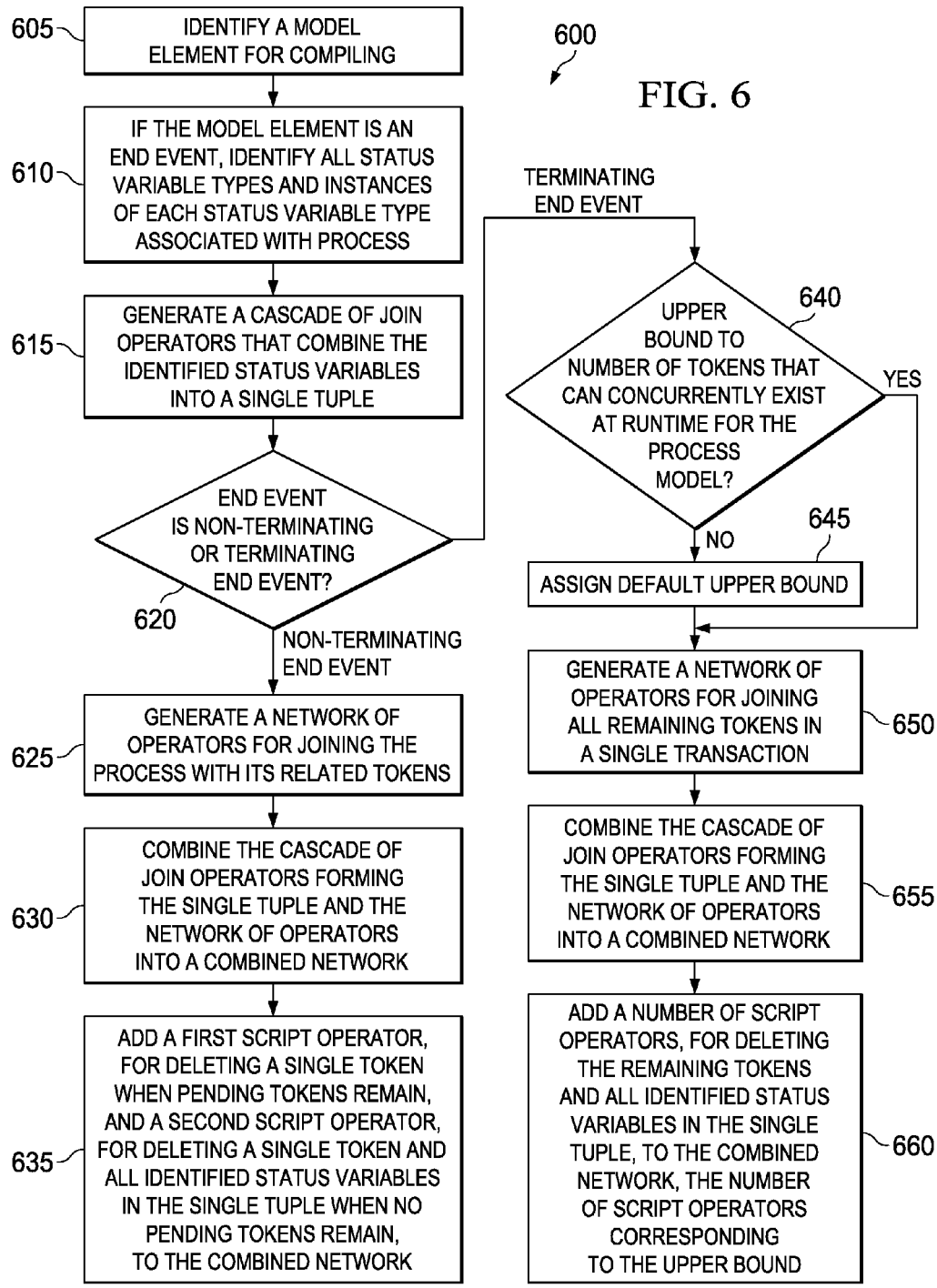
FIG. 6 illustrates an example process for generating operator networks at compile time using an appropriate system, such as the system described in FIG. 1.

FIG. 6 illustrates an example process 600 for generating, at compile time, a network of operators for reducing transaction load for process instance completion in a business process management suite runtime service. A model element is identified for compiling at 605. If the model element is an end event, all status variable types and instances of each status variable type associated with the process containing the model element are identified at 610. A cascade of join operators that combine the identified status variables into a single tuple is generated at 615. In some implementations, the cascade of join operators may be similar to operators 314, 316, 318, and 320 in FIG. 3. A determination is made at 620 for whether the end event is a non-terminating or terminating end event. If the end event is a non-terminating end event, a network of operators for joining the process with its related tokens is generated at 625. In certain implementations, the network of operators may be similar to the network depicted in FIG. 2. The cascade of join operators forming the single tuple and the network of operators may be combined into a combined network at 630. A first script operator, for deleting a single token when pending tokens remain, and a second script operator, for deleting a single token and all identified status variables in the single tuple when no pending tokens remain, may be added to the combined network at 635. The resulting combined network may be similar to the network depicted in FIG. 3.

If it is determined at 620 that the end event is a terminating end event, a determination may be made as to whether there is an upper bound to the number of tokens that can concurrently exist at runtime for the current process model at 640. If there is not an identified upper bound to the number of tokens, a default upper bound may be assigned at 645. If there is an identified upper bound to the number of tokens, or after a default upper bound has been assigned, a network of operators for joining all remaining tokens in a single transaction is generated at 650. In some implementations, the network of operators may be similar to the network depicted in FIG. 5. The cascade of join operators forming the single tuple (generated at 615) and the network of operators (generated at 650) may be combined into a combined network at 655. A number of script operators, for deleting the remaining tokens and all identified status variables in the single tuple, may be added to the combined network at 660, wherein the number of script operators may correspond to the upper bound of the number of tokens.

Figure 7:
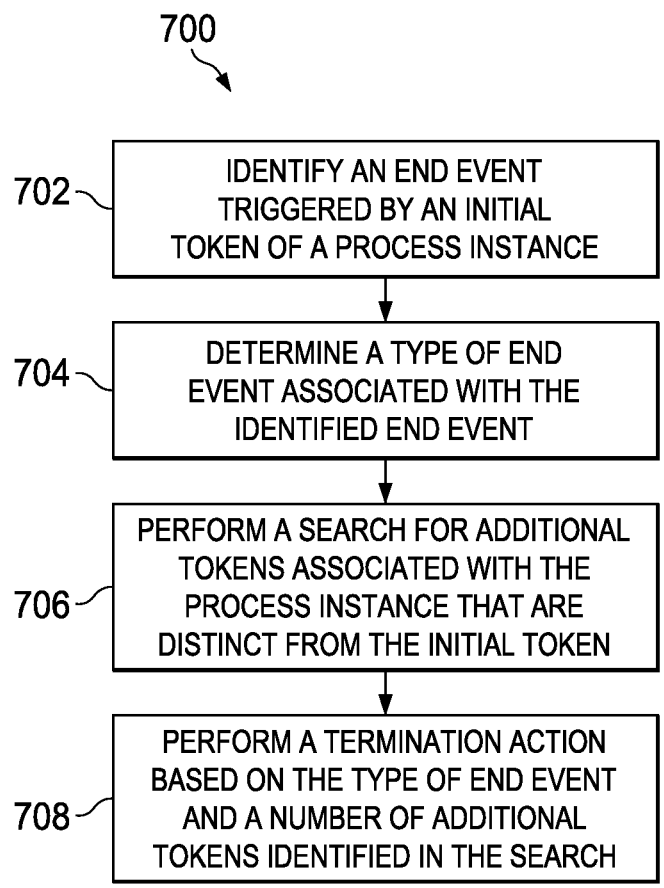
FIG. 7 illustrates an example process for executing an end event associated with a process instance using an appropriate system, such as the system described in FIG. 1.

FIG. 7 illustrates an example process 700 for executing, at runtime, an end event associated with a process instance. An end event triggered by an initial token of a process instance is identified at 702. A type of end event associated with the identified end event is determined at 704. A search for additional tokens associated with the process instance that are distinct from the initial token is performed at 706. A termination action is performed based on the type of end event and a number of additional tokens identified in the search at 708.

Figure 8:
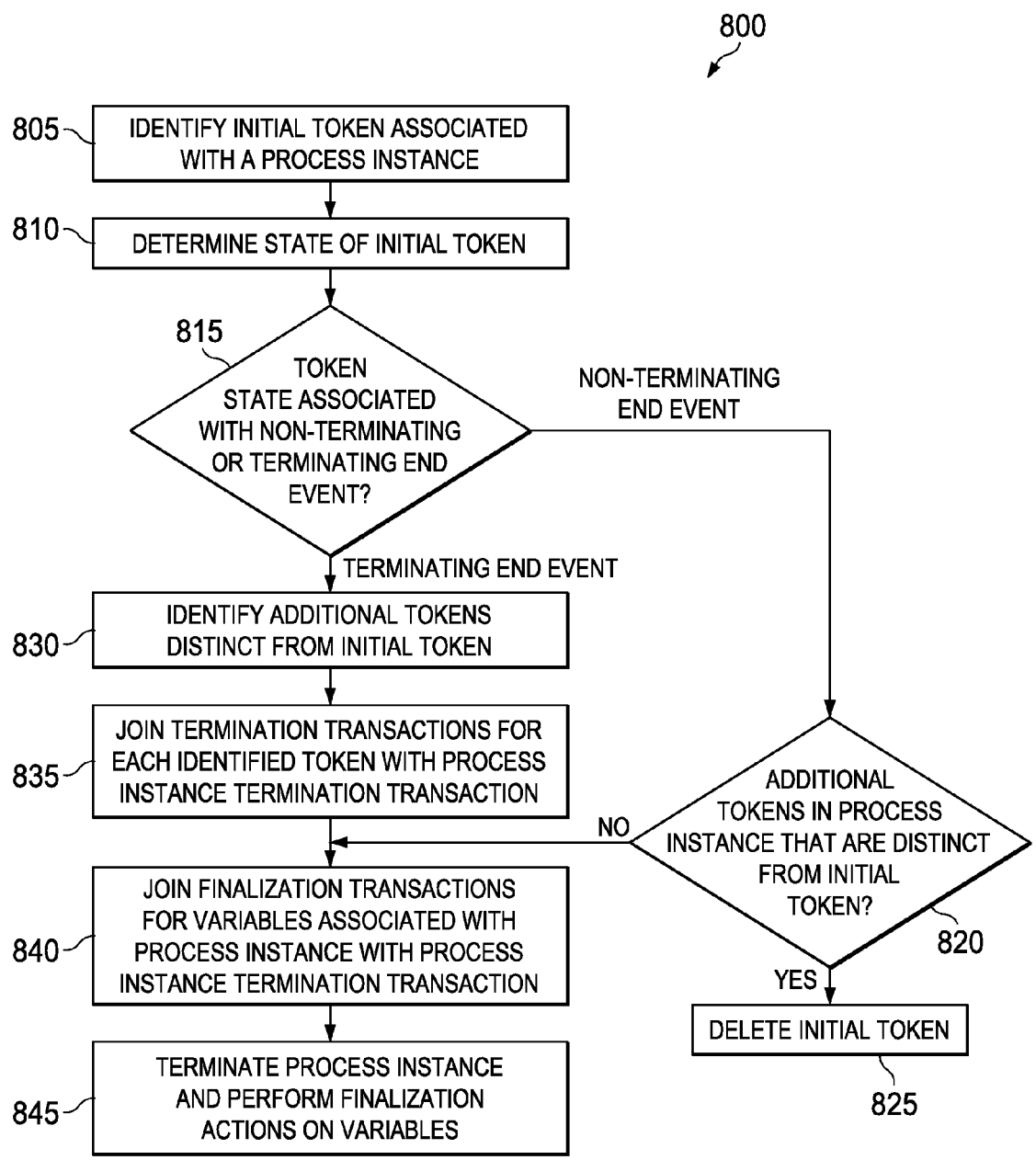
FIG. 8 illustrates an example process for executing an end event associated with a process instance using an appropriate system, such as the system described in FIG. 1.

FIG. 8 illustrates an example process 800 for executing an end event associated with a process instance. An initial token associated with a process instance is identified at 805. The state of the initial token is determined at 810. A determination is made as to whether the token state is associated with a non-terminating end event or a terminating end event at 815. If it is determined that the token state is associated with a non-terminating end event, a further determination is made as to whether there are additional tokens in the process instance that are distinct from the initial token at 820. If there are additional tokens in the process instance, the initial token is deleted at 825. If there are not additional tokens in the process instance, finalization transactions for variables associated with the process instance are joined with a process instance termination transaction at 840. The process instance is terminated and finalization actions are performed on the variables associated with the process instance at 845.

If it is determined that the token state is associated with a terminating end event, additional tokens distinct from the initial token are identified at 830. Termination transactions for each identified token are joined with the process instance termination transaction at 835. Finalization transactions for variables associated with the process instance are joined with the process instance termination transaction at 840. In some instances, the compiler can build a single transaction (or rule) at compile time to perform some or all of these operations. The process instance is terminated and finalization actions are performed on the variables associated with the process instance at 845.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for reducing transaction loads for process instance completion, the method comprising the following operations:
   identifying an end event triggered by an initial token of a process instance;
   determining a type of end event associated with the identified end event;
   performing a search for additional tokens associated with the process instance that are distinct from the initial token; and
   performing a termination action based on the type of end event and a number of additional tokens identified in the search, wherein the type of end event is a terminating end event and the termination action includes:
      joining a termination action of each additional token identified in the search to a completion transaction for the process instance;
      joining each finalization action for each process instance variable associated with the process instance to a completion transaction for the process instance when no additional tokens are identified in the search; and
      executing the completion transaction to terminate the process instance, wherein executing the completion transaction further includes executing each finalization transaction for each process instance variable.

2. The method of claim 1, wherein joining the termination action of each additional token identified in the search to the completion transaction for the process instance includes joining the termination at compile time into a single join rule and executing the join rule at runtime.

3. The method of claim 1, wherein determining the type of end event associated with the identified end event comprises determining whether the type of end event is one of a terminating event or a non-terminating event.

4. The method of claim 1, wherein each token corresponds to a thread of process instance execution.

5. The method of claim 1, wherein the terminating end event comprises an end event requiring termination of a particular token in a process instance that triggered the end event and any other tokens associated with the process instance.

6. A computer program product encoded on a non-transitory, tangible storage medium, the product comprising computer readable instructions for causing one or more processors to perform operations comprising:
   identifying an end event triggered by an initial token of a process instance;
   determining a type of end event associated with the identified end event;
   performing a search for additional tokens associated with the process instance that are distinct from the initial token; and
   performing a termination action based on the type of end event and a number of additional tokens identified in the search, wherein the type of end event is a terminating end event and the termination action includes:
      joining a termination action of each additional token identified in the search to a completion transaction for the process instance;
      joining each finalization action for each process instance variable associated with the process instance to a completion transaction for the process instance when no additional tokens are identified in the search; and
      executing the completion transaction to terminate the process instance, wherein executing the completion transaction further includes executing each finalization transaction for each process instance variable.

7. The computer program product of claim 6, wherein joining the termination action of each additional token identified in the search to the completion transaction for the process instance includes joining the termination at compile time into a single join rule and executing the join rule at runtime.

8. The computer program product of claim 6, wherein determining the type of end event associated with the identified end event comprises determining whether the type of end event is one of a terminating event or a non-terminating event.

9. The computer program product of claim 6, wherein each token corresponds to a thread of process instance execution.

10. The computer program product of claim 6, wherein the terminating end event comprises an end event requiring termination of a particular token in a process instance that triggered the end event and any other tokens associated with the process instance.

11. A system, comprising:
   one or more physical computers; and
   a computer-readable medium coupled to the one or more physical computers having instructions stored thereon which, when executed by the one or more physical computers, cause the one or more physical computers to perform operations comprising:
      identifying an end event triggered by an initial token of a process instance;
      determining a type of end event associated with the identified end event;
      performing a search for additional tokens associated with the process instance that are distinct from the initial token; and
      performing a termination action based on the type of end event and a number of additional tokens identified in the search, wherein the type of end event is a terminating end event and the termination action includes:
         joining a termination action of each additional token identified in the search to a completion transaction for the process instance;
         joining each finalization action for each process instance variable associated with the process instance to a completion transaction for the process instance when no additional tokens are identified in the search; and
         executing the completion transaction to terminate the process instance, wherein executing the completion transaction further includes executing each finalization transaction for each process instance variable.

12. The system of claim 11, wherein joining the termination action of each additional token identified in the search to the completion transaction for the process instance includes joining the termination at compile time into a single join rule and executing the join rule at runtime.

13. The system of claim 11, wherein determining the type of end event associated with the identified end event comprises determining whether the type of end event is one of a terminating event or a non-terminating event.

14. The system of claim 11, wherein each token corresponds to a thread of process instance execution.

15. The system of claim 11, wherein the terminating end event comprises an end event requiring termination of a particular token in a process instance that triggered the end event and any other tokens associated with the process instance.

* * * * *